United States Patent
Wang et al.

(10) Patent No.: US 11,188,654 B2
(45) Date of Patent: Nov. 30, 2021

(54) METHOD FOR DEFENDING CONTROL FLOW ATTACKS BASED ON XOR GATES

(71) Applicant: Ningbo University, Zhejiang (CN)

(72) Inventors: Pengjun Wang, Zhejiang (CN); Yunfei Yu, Zhejiang (CN); Yuejun Zhang, Zhejiang (CN); Haizhen Yu, Zhejiang (CN); Huihong Zhang, Zhejiang (CN)

(73) Assignee: Ningbo University, Zhejiang (CN)

(*) Notice: Subject to any disclaimer, the term of this patent is extended or adjusted under 35 U.S.C. 154(b) by 160 days.

(21) Appl. No.: 16/718,218

(22) Filed: Dec. 18, 2019

(65) Prior Publication Data

US 2021/0042415 A1 Feb. 11, 2021

(30) Foreign Application Priority Data

Aug. 9, 2019 (CN) .......................... 201910734385.7

(51) Int. Cl.
| | |
|---|---|
| *H04L 9/00* | (2006.01) |
| *G06F 21/57* | (2013.01) |
| *G06F 21/56* | (2013.01) |
| *G06F 21/60* | (2013.01) |
| *H04L 29/06* | (2006.01) |
| *H04L 17/02* | (2006.01) |

(52) U.S. Cl.
CPC ............ *G06F 21/57* (2013.01); *G06F 21/563* (2013.01); *G06F 21/602* (2013.01); *H04L 63/1441* (2013.01)

(58) Field of Classification Search
CPC ...... G06F 21/563; G06F 21/57; G06F 21/602; H04L 63/1441
See application file for complete search history.

(56) References Cited

U.S. PATENT DOCUMENTS

| | | | |
|---|---|---|---|
| 10,579,806 B1* | 3/2020 | Pyo .................... | G06F 9/44521 |
| 2013/0283017 A1* | 10/2013 | Wilkerson .......... | G06F 12/1483 |
| | | | 712/225 |
| 2016/0094552 A1* | 3/2016 | Durham ................. | G06F 21/00 |
| | | | 713/171 |
| 2018/0183574 A1* | 6/2018 | Ghosh .................. | H04L 9/0618 |
| 2021/0133314 A1* | 5/2021 | Wang ................... | H04L 9/0643 |
| 2021/0200862 A1* | 7/2021 | Lotspeich ............... | G06F 21/54 |

* cited by examiner

*Primary Examiner* — Gary S Gracia
(74) *Attorney, Agent, or Firm* — JCIPRNET

(57) ABSTRACT

The disclosure discloses a method for defending control flow attacks. When a data processor gives a response to an interrupt routine, a return address and a binary key are input to an encryption circuit to be encrypted to obtain an encrypted return address, and the obtained encrypted return address is synchronously written into a stack of the data processor and an built-in register bank; when the response given to the interrupt routine by the data processor is finished, the encrypted return address is read from the tack of the data processor and the built-in register bank; afterwards, the two encrypted return addresses are decrypted by first and second decryption circuits respectively to obtain two decrypted return addresses; and the two decrypted return addresses are compared to draw a conclusion whether the data process suffers from a control flow attack, and data processor determines to continue or terminate the routine accordingly.

7 Claims, 4 Drawing Sheets

METHOD FOR DEFENDING CONTROL FLOW ATTACKS BASED ON XOR GATES

CROSS REFERENCE TO RELATED APPLICATION

This application claims the priority benefits of China application serial no. 201910734385.7, filed on Aug. 9, 2019. The entirety of the above-mentioned patent application is hereby incorporated by reference herein and made a part of specification.

BACKGROUND

Field of the Disclosure

The disclosure relates to a method for defending control flow attacks, in particular to a method for defending control flow attacks based on XOR gates.

Description of Related Art

With the rapid development of Internet of Things, cloud computing and mobile payment, data processors (namely embedded systems) have been widely applied to the military, automotive, medical, communication fields, and the like. During communication and cooperation of different data processors through networks, an opportunity is created for attackers to perform control flow attacks by taking advantage of software vulnerabilities so as to control the whole data processors. Control flow attacks refer to guiding programs and executing preset malicious codes by tampering with storage addresses of control flows of the programs or by controlling control flow data by taking advantage of program bugs to destroy the data processors or to steal information. According to the presence or absence of malicious code injection, the control flow attacks include code injection attacks and code reuse attacks. Code injection attacks are performed by attackers by injecting malicious codes into programs by means of certain software vulnerabilities. As typical code injection attacks, stack overflow attacks may be launched by attackers when the quantity of data written into stacks of the data processors exceeds the capacity of the stacks and legal data is covered by overflow data once boundary checking is not performed by original programs. In this case, the attackers may tamper original return addresses with addresses pointing to pre-injected malicious codes by covering the original return addresses with overflow attacks, so as to hijack the control flows.

At present, when giving a response to an interrupt routine (namely when executing a routine calling instruction call), the data processor writes an address, responding to an execution instruction before an interruption, into a stack of the data processor by means of a Push function, and the address written at this moment is called a return address (an n-digit binary number, wherein n is greater than or equal to 1). When the response given to the interrupt routine is finished, the data processor executes a routine return instruction ret to read the return address from the stack by means of a Pop function and then continues to execute the instruction at the return address before the interruption.

The stack of the data processor is a limited memory space that is continuously distributed, the return address is written into the stack every time an interrupt routine is called, and when data written into the distributed memory space of the stack exceeds the data capacity of the stack, stack data will overflow, and in the case, overflow data will be written into the stack and then covers original data in the stack. When the attackers attack the data processor, the attackers write too much data into the stack after the return addresses are written into the stack to cause data overflow of the stack, which in turn tampers the original data in the stack with addresses pointing to malicious codes or consisting malicious codes to hijack control flows; at this moment, the data processor executes the routine return instruction ret, the addresses pointing to malicious codes or consisting malicious codes instead of the return addresses are read from the stack by means of the Pop function, and in this way, the attackers have the behaviors of the whole data processor under control. In view of this, existing data processors cannot defend control flow attacks, thereby being low in security.

SUMMARY OF THE DISCLOSURE

The technical issue to be settled by the disclosure is to provide a method for defending control flow attacks based on XOR gates. The method can defend control flow attacks on data processors, thus improving the security of the data processors.

The technical solution adopted by the disclosure to settle the above technical issue is as follows: a method for defending control flow attacks based on XOR gates comprises the following steps:

① Introducing an encryption circuit, an built-in register bank, a first decryption circuit, a second decryption circuit and an address comparator into a data processor, and setting an n-digit binary key which is marked as K[n−1:0];

② When the data processor executes a routine calling instruction call to give a response to an interrupt routine, inputting, by the data processor, an n-digit return address RA[n−1:0] and the n-digit binary key K[n−1:0] into the encryption circuit to perform XOR processing, and performing an XOR operation on the n-digit return address RA[n−1:0] and the n-digit binary key K[n−1:0] bitwise to obtain an encrypted n-digit return address which is marked as Encry_RA[n−1:0];

③ Synchronously writing the encrypted n-digit return address Encry_RA[n−1:0] into a stack of the data processor and the built-in register bank by means of a Push function operation;

④ When a routine return instruction ret is executed after the response given to the interrupt routine by the data processor is finished, reading the encrypted n-digit return address Encry_RA[n−1:0] from the stack of the data processor and the built-in register bank by means of a Pop function, wherein the encrypted n-digit return address read from the stack of the data processor is marked as Encry_RA1[n−1:0], and the encrypted n-digit return address read from the internal secure register bank is marked as Encry_RA2[n−1:0];

⑤ Inputting the encrypted n-digit return address Encry_RA1[n−1:0] and the n-digit binary key K[n−1:0] to the first decryption circuit to perform XOR processing, performing an XOR operation on the encrypted n-digit return address Encry_RA1[n−1:0] and the n-digit binary key K[n−1:0] bitwise to obtain a first decrypted n-digit return address which is marked as RA1[n−1:0], inputting the encrypted n-digit return address Encry_RA2[n−1:0] and the n-digit binary key K[n−1:0] to the second decryption circuit to perform XOR processing, and performing an XOR operation on the encrypted n-digit return address Encry_RA2[n−

1:0] and the n-digit binary key K[n−1:0] bitwise to obtain a second decrypted n-digit return address which is marked as RA2[n−1:0]; and ⑥ Sending the first decrypted n-digit return address RA1[n−1:0] and the second decrypted n-digit return address RA2[n−1:0] to the address comparator to make a comparison; if the first decrypted n-digit return address RA1[n−1:0] is identical with the second decrypted n-digit return address RA2[n−1:0], outputting a result 1 by the address comparator, and continuing to execute the routine by the data processor; or if the first decrypted n-digit return address RA1[n−1:0] is different from the second decrypted n-digit return address RA2[n−1:0], outputting a result 0 by the address comparator, instantly setting a reset signal RESET to an active level by the data processor, and resetting the data processor to stop executing the routine.

The encryption circuit comprises n two-input XOR gates, wherein each two-input XOR gate has two input terminals and an XOR logic value output terminal, $j^{th}$-bit data of the n-digit return address RA[n−1:0] and $j^{th}$-bit data of the n-digit binary key K[n−1:0] are respectively accessed to the two input terminals of the $j^{th}$ two-input XOR gate in the encryption circuit, an XOR logic value output by the XOR logic value output terminal of the $j^{th}$ two-input XOR gate in the encryption circuit is jth-digit data of the encrypted n-digit return address Encry_RA[n−1:0], and j=1, 2, ..., n.

The first decryption circuit comprises n two-input XOR gates, wherein each two-input XOR gate has two input terminals and an XOR logic value output terminal, jth-bit data of Encry_RA1[n−1:0] and the jth-bit data of the n-digit binary key K[n−1:0] are respectively accessed to the two input terminals of the jth two-input XOR gate in the first decryption circuit, an XOR logic value output by the XOR logic value output terminal of the jth two-input XOR gate in the first decryption circuit is jth-digit data of the first decrypted n-digit return address RA1[n−1:0], and j=1, 2, ..., n.

The second decryption circuit comprises n two-input XOR gates, wherein each two-input XOR gate has two input terminals and an XOR logic value output terminal, $j^{th}$-bit data of Encry_RA2[n−1:0] and the $j^{th}$-bit data of the n-digit binary key K[n−1:0] are respectively accessed to the two input terminals of the $j^{th}$ two-input XOR gate in the second decryption circuit, an XOR logic value output by the XOR logic value output terminal of the $j^{th}$ two-input XOR gate in the second decryption circuit is $j^{th}$-digit data of the second decrypted n-digit return address RA2[n−1:0], and j=1, 2, ..., n.

Each two-input XOR gate comprises a first PMOS transistor, a second PMOS transistor, a third PMOS transistor, a fourth PMOS transistor, a fifth PMOS transistor, a sixth PMOS transistor, a first NMOS transistor, a second NMOS transistor, a third NMOS transistor, a fourth NMOS transistor, a fifth NMOS transistor and a sixth NMOS transistor, wherein a source of the first PMOS transistor, a source of the second PMOS transistor, a source of the third PMOS transistor and a source of the fourth PMOS transistor are accessed to a power supply; a gate of the first PMOS transistor, a gate of the first NMOS transistor, a gate of the third PMOS transistor and a gate of the third NMOS transistor are connected, and a connecting terminal is a first input terminal of the two-input XOR gate; a drain of the first PMOS transistor, a drain of the first NMOS transistor, a gate of the fifth PMOS transistor and a gate of the fourth NMOS transistor are connected; a drain of the second PMOS transistor, a drain of the second NMOS transistor, a gate of the sixth PMOS transistor and a gate of the sixth NMOS transistor are connected; a gate of the second PMOS transistor, a gate of the second NMOS transistor, a gate of the fourth PMOS transistor and a gate of the fifth NMOS transistor are connected, and a connecting terminal is a second input terminal of the two-input XOR gate; a drain of the third PMOS transistor, a drain of the fourth PMOS transistor, a source of the fifth PMOS transistor and a source of the sixth PMOS transistor are connected; a drain of the fifth PMOS transistor, a drain of the sixth PMOS transistor, a drain of the third NMOS transistor and a drain of the fourth NMOS transistor are connected, and a connecting terminal is the XOR logic value output terminal of the two-input XOR gate; a source of the first NMOS transistor, a source of the second NMOS transistor, a source of the fifth NMOS transistor and a source of the sixth NMOS transistor are grounded; a source of the third NMOS transistor is connected with a drain of the fifth NMOS transistor; and a source of the fourth NMOS transistor is connected with a drain of the sixth NMOS transistor. In each two-input XOR gate, the first PMOS transistor and the first NMOS transistor constitute a first inverter, the second PMOS transistor and the second NOMS transistor constitute a second inverter, the third NMOS transistor, the fifth NMOS transistor, the fourth NMOS transistor and the sixth NMOS transistor constitute a pull-down network, and the third PMOS transistor, the fifth PMOS transistor, the fourth PMOS transistor and the sixth PMOS transistor constitute a pull-up network; two input signals input to the two-input XOR gate are referred to as signal A and signal B, a first input signal is marked as A, and a second input signal is marked as B; after signal A is input the first inverter, a NOT signal A' of signal A is generated; after signal B is input to the second inverter, a NOT signal B' of signal B is generated; when signal A and signal B reach the gate of the third NMOS transistor and the gate of the fifth NMOS transistor, an AND operation on signal A and signal B is realized to obtain an AND logic value AB; when the NOT signal A' and the NOT signal B' reach the gate of the fourth NMOS transistor and the gate of the sixth NMOS transistor, an AND operation on the NOT signal A' and the NOT signal B' is realized to obtain an AND logic value A'B'; the third NMOS transistor and the fifth NMOS transistor constitute a first series circuit, the fourth NMOS transistor and the sixth NMOS transistor constitute a second series circuit, and the first series circuit and the second series circuit are connected in parallel to realize an OR operation on AB and A'B' to obtain an OR logic value AB+A'B'; and the OR logic value AB+A'B' is reversed to obtain an NOT logic value (AB+A'B')' of the OR logic value AB+A'B', so that an XOR operation is realized. The two-input XOR gate realizes the XOR operation by means of a CMOS static complementary circuit structure constructed by 12 MOS transistors and has a low in quiescent current, a simple circuit structure and low hardware consumption, so that high hardware consumption and high power consumption are avoided in the process of defending control flow attacks.

Compared with the prior art, the disclosure has the following advantages: an encryption circuit, an built-in register bank, a first decryption circuit, a second decryption circuit and an address comparator are introduced into a data processor, and an n-digit binary key marked as K[n−1:0] is set; when the data processor executes a routine calling instruction call to give a response to an interrupt routine, an n-digit return address is not directly written into a stack, instead, the n-digit return address and the n-digit binary key are input to the encryption circuit to be encrypted to obtain an encrypted n-digit return address, and the obtained encrypted n-digit return address is synchronously written into the stack of the data processor and the built-in register bank; when a routine return instruction ret is executed after the response given to the interrupt routine by the data processor is finished, the encrypted n-digit return address is read from the stack of the data processor and the built-in register bank by means of a Pop function; the encrypted n-digit return address read from the stack of the data processor is decrypted by means of the first decryption circuit to obtain a first decrypted n-digit return address, and the encrypted n-digit return address read from the built-in register bank is decrypted by means of the second decryption circuit to obtain a second decrypted n-digit return address; afterwards, the first decrypted n-digit return address is compared with the second decrypted n-digit return address by means of the address comparator; if the first decrypted n-digit return address is identical with the second decrypted n-digit return address, the address comparator outputs a result 1, and in the case, the data processor does not suffer from a control flow attack and continues to execute the routine; or, if the first decrypted n-digit return address is different from the second decrypted n-digit return address, the address comparator outputs a result 0, and in this case, the data processor suffers from a control flow attack and is reset to stop executing the routine. In this way, the routine will not skip to the target address desired by an attacker, and the control flow attack is defended. Therefore, the method can defend control flow attacks on the data processor, thereby improving the security of the data processor.

DESCRIPTION OF EMBODIMENTS

The disclosure is further expounded below with reference to the accompanying drawings and embodiments.

Figure 1:
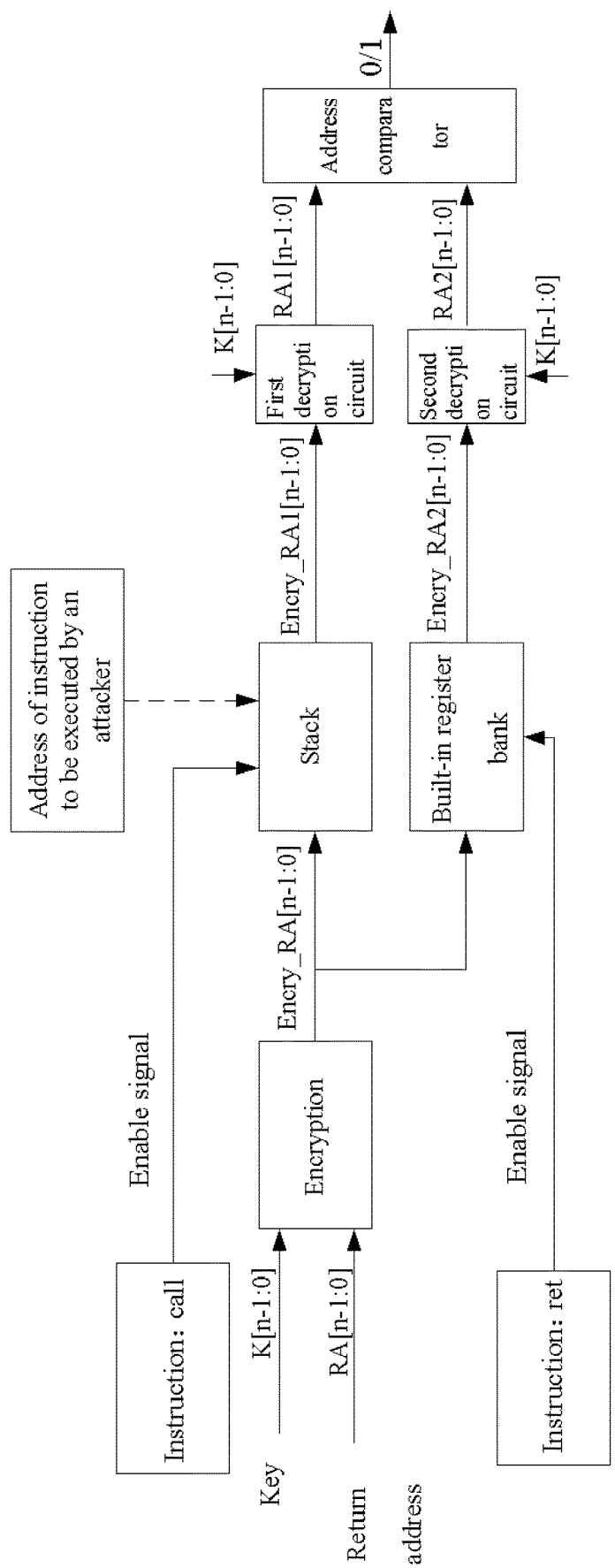
FIG. 1 is a hardware structural diagram of a method for defending control flow attacks based on XOR gates of the disclosure.

Embodiment: as shown in FIG. 1, a method for defending control flow attacks based on XOR gates comprises the following steps:

An encryption circuit, an built-in register bank, a first decryption circuit, a second decryption circuit and an address comparator are introduced into a data processor, and an n-digit binary key which is marked as $K[n-1:0]$ is set;

When the data processor executes a routine calling instruction call to give a response to an interrupt routine, the data processor inputs an n-digit return address $RA[n-1:0]$ and the n-digit binary key $K[n-1:0]$ into the encryption circuit to perform XOR processing, and an XOR operation is performed on the n-digit return address $RA[n-1:0]$ and the n-digit binary key $K[n-1:0]$ bitwise to obtain an encrypted n-digit return address which is marked as $Encry\_RA[n-1:0]$;

The encrypted n-digit return address $Encry\_RA[n-1:0]$ is synchronously written into a stack of the data processor and the built-in register bank by means of a Push function operation;

④ When a routine return instruction ret is executed after the response given to the interrupt routine by the data processor is finished, the encrypted n-digit return address $Encry\_RA[n-1:0]$ is read from the stack of the data processor and the built-in register bank by means of a Pop function, wherein the encrypted n-digit return address read from the stack of the data processor is marked as $Encry\_RA1[n-1:0]$, and the encrypted n-digit return address read from the built-in register bank is marked as $Encry\_RA2[n-1:0]$;

⑤ The encrypted n-digit return address $Encry\_RA1[n-1:0]$ and the n-digit binary key $K[n-1:0]$ are input to the first decryption circuit to perform XOR processing, an XOR operation is performed on the encrypted n-digit return address $Encry\_RA1[n-1:0]$ and the n-digit binary key $K[n-1:0]$ bitwise to obtain a first decrypted n-digit return address which is marked as $RA1[n-1:0]$, the encrypted n-digit return address $Encry\_RA2[n-1:0]$ and the n-digit binary key $K[n-1:0]$ are input to the second decryption circuit to perform XOR processing, and an XOR operation is performed on the encrypted n-digit return address $Encry\_RA2[n-1:0]$ and the n-digit binary key $K[n-1:0]$ bitwise to obtain a second decrypted n-digit return address which is marked as $RA2[n-1:0]$; and ⑥ The first decrypted n-digit return address $RA1[n-1:0]$ and the second decrypted n-digit return address $RA2[n-1:0]$ are sent to the address comparator to make a comparison; if the first decrypted n-digit return address $RA1[n-1:0]$ is identical with the second decrypted n-digit return address $RA2[n-1:0]$, the address comparator outputs a result 1 and continues to execute the routine by the data processor; or if the first decrypted n-digit return address $RA1[n-1:0]$ is different from the second decrypted n-digit return address $RA2[n-1:0]$, the address comparator outputs a result 0 and instantly sets a reset signal RESET to an active level, and the data processor is reset to stop executing the routine.

Figure 2:
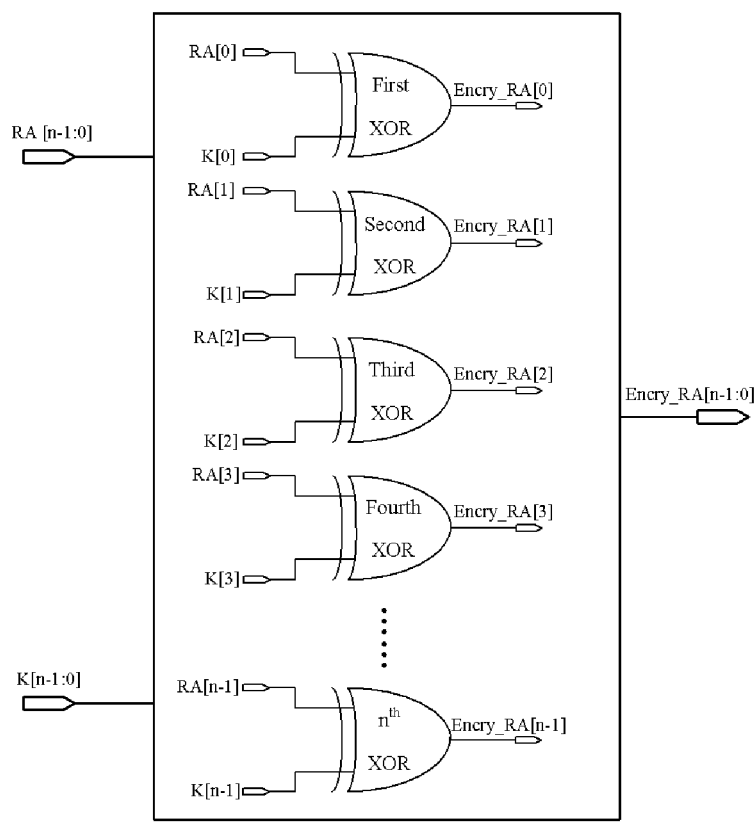
FIG. 2 is a structural diagram of an encryption circuit of the method for defending control flow attacks based on XOR gates of the disclosure.

As shown in FIG. 2, in this embodiment, the encryption circuit comprises n two-input XOR gates, wherein each two-input XOR gate has two input terminals and an XOR logic value output terminal, $j^{th}$-bit data of the n-digit return address $RA[n-1:0]$ and $j^{th}$-bit data of the n-digit binary key $K[n-1:0]$ are respectively accessed to the two input terminals of the $j^{th}$ two-input XOR gate in the encryption circuit, an XOR logic value output by the XOR logic value output terminal of the jth two-input XOR gate in the encryption circuit is jth-digit data of the encrypted n-digit return address $Encry\_RA[n-1:0]$, and $j=1, 2, \ldots, n$.

Figure 3:
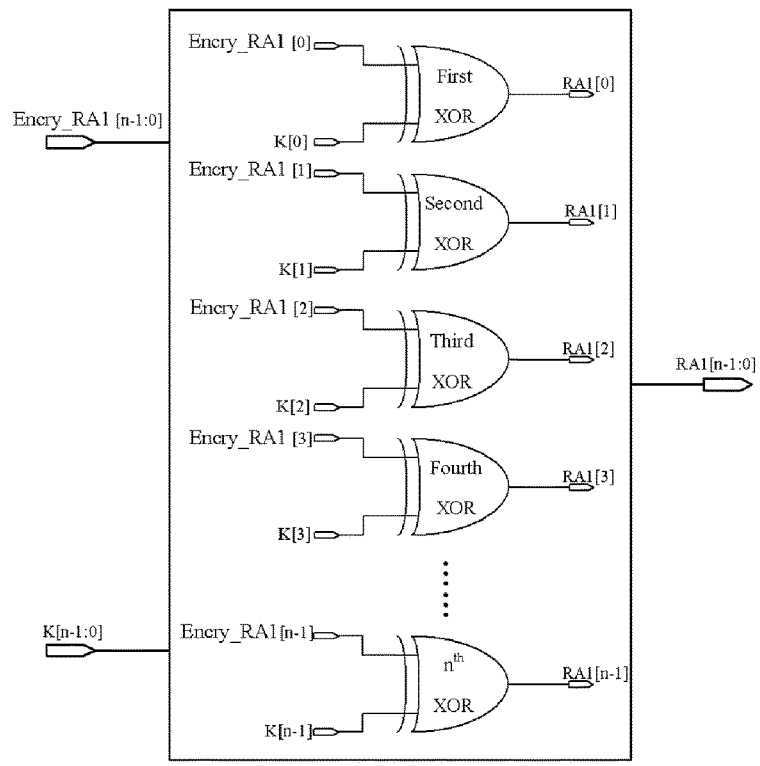
FIG. 3 is a structural diagram of a first decryption circuit of the method for defending control flow attacks based on XOR gates of the disclosure.

As shown in FIG. 3, in this embodiment, the first decryption circuit comprises n two-input XOR gates, wherein each two-input XOR gate has two input terminals and an XOR logic value output terminal, jth-bit data of $Encry\_RA1[n-1:0]$ and the jth-bit data of the n-digit binary key $K[n-1:0]$ are respectively accessed to the two input terminals of the $j^{th}$ two-input XOR gate in the first decryption circuit, an XOR logic value output by the XOR logic value output terminal of the $j^{th}$ two-input XOR gate in the first decryption circuit is $j^{th}$-digit data of the first decrypted n-digit return address $RA1[n-1:0]$, and $j=1, 2, \ldots, n$.

Figure 4:
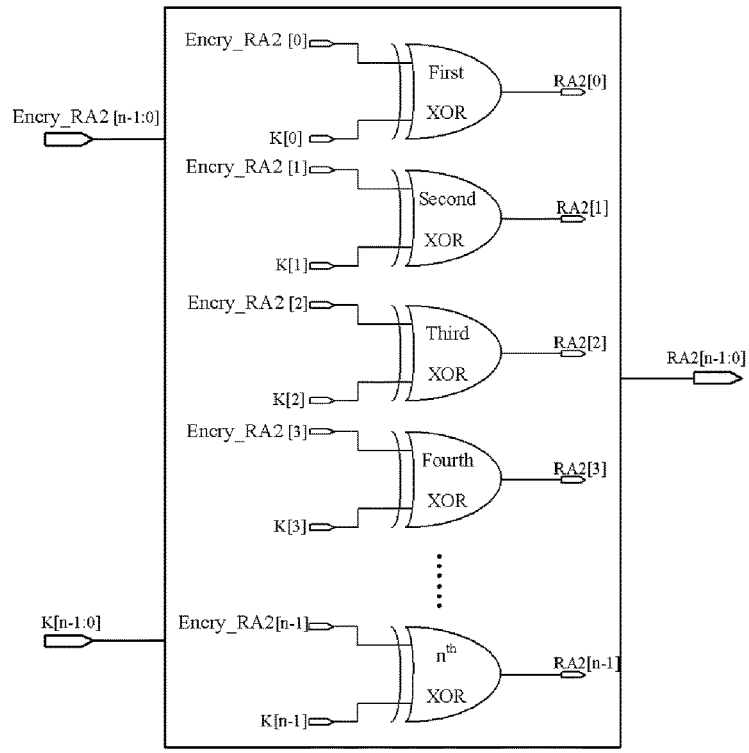
FIG. 4 is a structural diagram of a second decryption circuit of the method for defending control flow attacks based on XOR gates of the disclosure.

As shown in FIG. 4, in this embodiment, the second decryption circuit comprises n two-input XOR gates, wherein each two-input XOR gate has two input terminals and an XOR logic value output terminal, $j^{th}$-bit data of $Encry\_RA2[n-1:0]$ and the $j^{th}$-bit data of the n-digit binary key $K[n-1:0]$ are respectively accessed to the two input terminals of the $j^{th}$ two-input XOR gate in the second decryption circuit, an XOR logic value output by the XOR logic value output terminal of the jth two-input XOR gate in the second decryption circuit is jth-digit data of the second decrypted n-digit return address RA2[$n$–1:0], and j=1, 2, ..., n.

Figure 5:
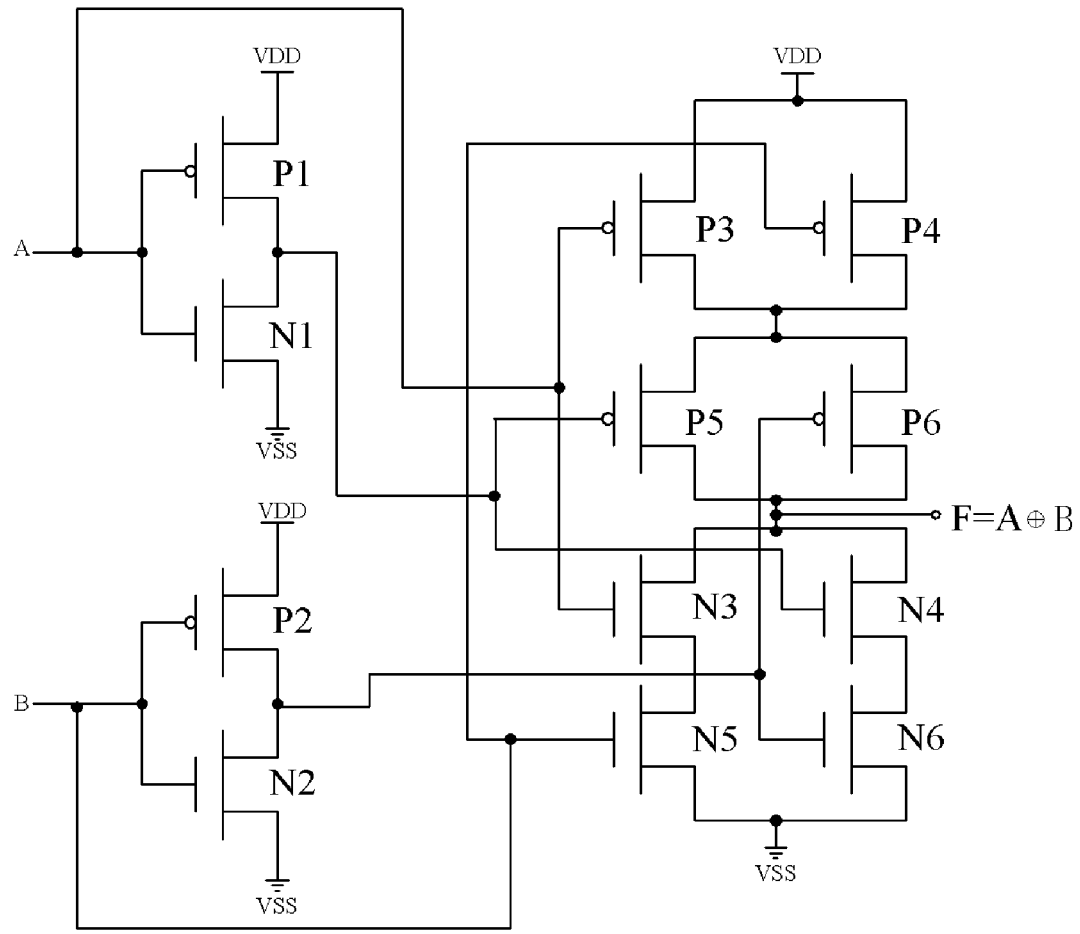
FIG. 5 is a circuit diagram of two input XOR gates of the method for defending control flow attacks based on XOR gates of the disclosure.

As shown in FIG. 5, in this embodiment, each two-input XOR gate comprises a first PMOS transistor, a second PMOS transistor, a third PMOS transistor, a fourth PMOS transistor, a fifth PMOS transistor, a sixth PMOS transistor, a first NMOS transistor, a second NMOS transistor, a third NMOS transistor, a fourth NMOS transistor, a fifth NMOS transistor and a sixth NMOS transistor, wherein a source of the first PMOS transistor, a source of the second PMOS transistor, a source of the third PMOS transistor and a source of the fourth PMOS transistor are accessed to a power supply; a gate of the first PMOS transistor, a gate of the first NMOS transistor, a gate of the third PMOS transistor and a gate of the third NMOS transistor are connected, and a connecting terminal is a first input terminal of the two-input XOR gate; a drain of the first PMOS transistor, a drain of the first NMOS transistor, a gate of the fifth PMOS transistor and a gate of the fourth NMOS transistor are connected; a drain of the second PMOS transistor, a drain of the second NMOS transistor, a gate of the sixth PMOS transistor and a gate of the sixth NMOS transistor are connected; a gate of the second PMOS transistor, a gate of the second NMOS transistor, a gate of the fourth PMOS transistor and a gate of the fifth NMOS transistor are connected, and a connecting terminal is a second input terminal of the two-input XOR gate; a drain of the third PMOS transistor, a drain of the fourth PMOS transistor, a source of the fifth PMOS transistor and a source of the sixth PMOS transistor are connected; a drain of the fifth PMOS transistor, a drain of the sixth PMOS transistor, a drain of the third NMOS transistor and a drain of the fourth NMOS transistor are connected, and a connecting terminal is the XOR logic value output terminal of the two-input XOR gate; a source of the first NMOS transistor, a source of the second NMOS transistor, a source of the fifth NMOS transistor and a source of the sixth NMOS transistor are grounded; a source of the third NMOS transistor is connected with a drain of the fifth NMOS transistor; and a source of the fourth NMOS transistor is connected with a drain of the sixth NMOS transistor.

What is claimed is:

1. A method for defending control flow attacks based on XOR gates, comprising the following steps:
   ① introducing an encryption circuit, a built-in register bank, a first decryption circuit, a second decryption circuit and an address comparator into a data processor, and setting a n-digit binary key which is marked as K[n–1:0];
   ② when the data processor executes a routine calling instruction call to give a response to an interrupt routine, inputting, by the data processor, a n-digit return address RA[n–1:0] and the n-digit binary key K[n–1:0] into the encryption circuit to perform XOR processing, and performing an XOR operation on the n-digit return address RA[n–1:0] and the n-digit binary key K[n–1:0] bitwise to obtain an encrypted n-digit return address which is marked as Encry_RA[n–1:0];
   ③ synchronously writing the encrypted n-digit return address Encry_RA[n–1:0] into a stack of the data processor and the built-in register bank by means of a Push function operation;
   ④ when a routine return instruction ret is executed after the response given to the interrupt routine by the data processor is finished, reading the encrypted n-digit return address Encry_RA[n–1:0] from the stack of the data processor and the built-in register bank by means of a Pop function, wherein the encrypted n-digit return address read from the stack of the data processor is marked as Encry_RA1[$n$–1:0], and the encrypted n-digit return address read from the internal secure register bank is marked as Encry_RA2[$n$–1:0];
   ⑤ inputting the encrypted n-digit return address Encry_RA1[$n$–1:0] and the n-digit binary key K[n–1:0] to the first decryption circuit to perform XOR processing, performing an XOR operation on the encrypted n-digit return address Encry_RA1[$n$–1:0] and the n-digit binary key K[n–1:0] bitwise to obtain a first decrypted n-digit return address which is marked as RA1[$n$–1:0], inputting the encrypted n-digit return address Encry_RA2[$n$–1:0] and the n-digit binary key K[n–1:0] to the second decryption circuit to perform XOR processing, and performing an XOR operation on the encrypted n-digit return address Encry_RA2[$n$–1:0] and the n-digit binary key K[n–1:0] bitwise to obtain a second decrypted n-digit return address which is marked as RA2[$n$–1:0]; and
   ⑥ sending the first decrypted n-digit return address RA1[$n$–1:0] and the second decrypted n-digit return address RA2[$n$–1:0] to the address comparator to make a comparison; if the first decrypted n-digit return address RA1[$n$–1:0] is identical with the second decrypted n-digit return address RA2[$n$–1:0], outputting a result 1 by the address comparator, and continuing to execute the routine by the data processor; or if the first decrypted n-digit return address RA1[$n$–1:0] is different from the second decrypted n-digit return address RA2[$n$–1:0], outputting a result 0 by the address comparator, instantly setting a reset signal RESET to an active level by the data processor, and resetting the data processor to stop executing the routine.

2. The method for defending control flow attacks based on XOR gates according to claim 1, wherein the encryption circuit comprises n two-input XOR gates, wherein each two-input XOR gate has two input terminals and an XOR logic value output terminal, $j^{th}$-bit data of the n-digit return address RA[n–1:0] and $j^{th}$-bit data of the n-digit binary key K[n–1:0] are respectively accessed to the two input terminals of the $j^{th}$ two-input XOR gate in the encryption circuit, an XOR logic value output by the XOR logic value output terminal of the $j^{th}$ two-input XOR gate in the encryption circuit is $j^{th}$-digit data of the encrypted n-digit return address Encry_RA[n–1:0], and j=1, 2, ..., n.

3. The method for defending control flow attacks based on XOR gates according to claim 2, wherein each two-input XOR gate comprises a first PMOS transistor, a second PMOS transistor, a third PMOS transistor, a fourth PMOS transistor, a fifth PMOS transistor, a sixth PMOS transistor, a first NMOS transistor, a second NMOS transistor, a third NMOS transistor, a fourth NMOS transistor, a fifth NMOS transistor and a sixth NMOS transistor, wherein a source of the first PMOS transistor, a source of the second PMOS transistor, a source of the third PMOS transistor and a source of the fourth PMOS transistor are accessed to a power supply; a gate of the first PMOS transistor, a gate of the first NMOS transistor, a gate of the third PMOS transistor and a gate of the third NMOS transistor are connected, and a connecting terminal is a first input terminal of the two-input XOR gate; a drain of the first PMOS transistor, a drain of the first NMOS transistor, a gate of the fifth PMOS transistor and a gate of the fourth NMOS transistor are connected; a drain of the second PMOS transistor, a drain of the second NMOS transistor, a gate of the sixth PMOS transistor and a gate of the sixth NMOS transistor are connected; a gate of the second PMOS transistor, a gate of the second NMOS transistor, a gate of the fourth PMOS transistor and a gate of the fifth NMOS transistor are connected, and a connecting terminal is a second input terminal of the two-input XOR gate; a drain of the third PMOS transistor, a drain of the fourth PMOS transistor, a source of the fifth PMOS transistor and a source of the sixth PMOS transistor are connected; a drain of the fifth PMOS transistor, a drain of the sixth PMOS transistor, a drain of the third NMOS transistor and a drain of the fourth NMOS transistor are connected, and a connecting terminal is the XOR logic value output terminal of the two-input XOR gate; a source of the first NMOS transistor, a source of the second NMOS transistor, a source of the fifth NMOS transistor and a source of the sixth NMOS transistor are grounded; a source of the third NMOS transistor is connected with a drain of the fifth NMOS transistor; and a source of the fourth NMOS transistor is connected with a drain of the sixth NMOS transistor.

4. The method for defending control flow attacks based on XOR gates according to claim 1, wherein the first decryption circuit comprises n two-input XOR gates, wherein each two-input XOR gate has two input terminals and an XOR logic value output terminal, $j^{th}$-bit data of Encry_RA1[$n-1$:0] and the $j^{th}$-bit data of the n-digit binary key K[n−1:0] are respectively accessed to the two input terminals of the $j^{th}$ two-input XOR gate in the first decryption circuit, an XOR logic value output by the XOR logic value output terminal of the $j^{th}$ two-input XOR gate in the first decryption circuit is $j^{th}$-digit data of the first decrypted n-digit return address RA1[$n-1$:0], and j=1, 2, . . . , n.

5. The method for defending control flow attacks based on XOR gates according to claim 4, wherein each two-input XOR gate comprises a first PMOS transistor, a second PMOS transistor, a third PMOS transistor, a fourth PMOS transistor, a fifth PMOS transistor, a sixth PMOS transistor, a first NMOS transistor, a second NMOS transistor, a third NMOS transistor, a fourth NMOS transistor, a fifth NMOS transistor and a sixth NMOS transistor, wherein a source of the first PMOS transistor, a source of the second PMOS transistor, a source of the third PMOS transistor and a source of the fourth PMOS transistor are accessed to a power supply; a gate of the first PMOS transistor, a gate of the first NMOS transistor, a gate of the third PMOS transistor and a gate of the third NMOS transistor are connected, and a connecting terminal is a first input terminal of the two-input XOR gate; a drain of the first PMOS transistor, a drain of the first NMOS transistor, a gate of the fifth PMOS transistor and a gate of the fourth NMOS transistor are connected; a drain of the second PMOS transistor, a drain of the second NMOS transistor, a gate of the sixth PMOS transistor and a gate of the sixth NMOS transistor are connected; a gate of the second PMOS transistor, a gate of the second NMOS transistor, a gate of the fourth PMOS transistor and a gate of the fifth NMOS transistor are connected, and a connecting terminal is a second input terminal of the two-input XOR gate; a drain of the third PMOS transistor, a drain of the fourth PMOS transistor, a source of the fifth PMOS transistor and a source of the sixth PMOS transistor are connected; a drain of the fifth PMOS transistor, a drain of the sixth PMOS transistor, a drain of the third NMOS transistor and a drain of the fourth NMOS transistor are connected, and a connecting terminal is the XOR logic value output terminal of the two-input XOR gate; a source of the first NMOS transistor, a source of the second NMOS transistor, a source of the fifth NMOS transistor and a source of the sixth NMOS transistor are grounded; a source of the third NMOS transistor is connected with a drain of the fifth NMOS transistor; and a source of the fourth NMOS transistor is connected with a drain of the sixth NMOS transistor.

6. The method for defending control flow attacks based on XOR gates according to claim 1, wherein The second decryption circuit comprises n two-input XOR gates, wherein each two-input XOR gate has two input terminals and an XOR logic value output terminal, $j^{th}$-bit data of Encry_RA2[$n-1$:0] and the $j^{th}$-bit data of the n-digit binary key K[n−1:0] are respectively accessed to the two input terminals of the $j^{th}$ two-input XOR gate in the second decryption circuit, an XOR logic value output by the XOR logic value output terminal of the $j^{th}$ two-input XOR gate in the second decryption circuit is $j^{th}$-digit data of the second decrypted n-digit return address RA2[$n-1$:0], and j=1, 2, . . . , n.

7. The method for defending control flow attacks based on XOR gates according to claim 6, wherein each two-input XOR gate comprises a first PMOS transistor, a second PMOS transistor, a third PMOS transistor, a fourth PMOS transistor, a fifth PMOS transistor, a sixth PMOS transistor, a first NMOS transistor, a second NMOS transistor, a third NMOS transistor, a fourth NMOS transistor, a fifth NMOS transistor and a sixth NMOS transistor, wherein a source of the first PMOS transistor, a source of the second PMOS transistor, a source of the third PMOS transistor and a source of the fourth PMOS transistor are accessed to a power supply; a gate of the first PMOS transistor, a gate of the first NMOS transistor, a gate of the third PMOS transistor and a gate of the third NMOS transistor are connected, and a connecting terminal is a first input terminal of the two-input XOR gate; a drain of the first PMOS transistor, a drain of the first NMOS transistor, a gate of the fifth PMOS transistor and a gate of the fourth NMOS transistor are connected; a drain of the second PMOS transistor, a drain of the second NMOS transistor, a gate of the sixth PMOS transistor and a gate of the sixth NMOS transistor are connected; a gate of the second PMOS transistor, a gate of the second NMOS transistor, a gate of the fourth PMOS transistor and a gate of the fifth NMOS transistor are connected, and a connecting terminal is a second input terminal of the two-input XOR gate; a drain of the third PMOS transistor, a drain of the fourth PMOS transistor, a source of the fifth PMOS transistor and a source of the sixth PMOS transistor are connected; a drain of the fifth PMOS transistor, a drain of the sixth PMOS transistor, a drain of the third NMOS transistor and a drain of the fourth NMOS transistor are connected, and a connecting terminal is the XOR logic value output terminal of the two-input XOR gate; a source of the first NMOS transistor, a source of the second NMOS transistor, a source of the fifth NMOS transistor and a source of the sixth NMOS transistor are grounded; a source of the third NMOS transistor is connected with a drain of the fifth NMOS transistor; and a source of the fourth NMOS transistor is connected with a drain of the sixth NMOS transistor.

* * * * *